United States Patent Office 3,565,967
Patented Feb. 23, 1971

3,565,967
PROCESS FOR MANUFACTURING 1,4-DIENES
OF HIGH TRANS/CIS RATIO
John Wilfred Collette and Aaron Chung Liong Su, Wilmington, Del., assignors to E. I. du Pont de Nemours and Company, Wilmington, Del., a corporation of Delaware
No Drawing. Filed June 9, 1969, Ser. No. 831,767
Int. Cl. C07c 11/12
U.S. Cl. 260—680                8 Claims

ABSTRACT OF THE DISCLOSURE 1.4-dienes of trans/cis-isomer ratio of at least 4:1 are made by contacting ethylene with a 1,3-diene in the presence of a zerovalent or divalent nickel compound, soluble in organic liquids, an organoaluminum chloride or bromide, and a tertiary phosphine having the formula

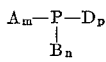

where A is the naphthyl radical; B is an alkyl radical having 1–6 carbon atoms or allyl; D is the phenyl or a substituted phenyl radical having one or more specific substituents; $m$, $n$ and $p$ are integers whose sum $m+n+p=3$; $p$ is at least 1; $m$ is at most 1, and each of $m$ and $n$ individually can be 0. The reaction can be run at either atmospheric or superatmospheric pressures in a batchwise or continuous process.

BACKGROUND OF THE INVENTION

This invention relates to a process for manufacturing 1,4-dienes of high trans-isomer content.

Sulfur-curable elastomeric copolymers of $\alpha$-olefins with nonconjugated dienes are well known. Particularly important are terpolymers of ethylene with propylene and a diene monomer having only one polymerizable double bond. Such terpolymers are known in the industry as EPDM elastomers. The nonconjugated diene comonomer generally is a 1,4-diene such as 1,4-hexadiene, 5-ethylidene-2-norbornene, or 5-methylene-2-norbornene. Terpolymers of this type are finding increased use, for instance, in manufacture of molded automobile parts, transmission belts, and hoses.

1,4-dienes can be prepared by several processes, including a catalytic addition of an $\alpha$-olefin to a conjugated diene. U.S. Pat. 3,306,948 to Kealy discloses such a catalytic process, wherein the reactants are contacted in the presence of a catalyst made from at least two moles of an organometallic compound and one mold of a nickel compound containing at least one monodentate trivalent phosphorus ligand. The organo metallic compound can be for example an aluminum alkyl, an aluminum aryl, or an organoaluminum halide.

Although this process gives high yields of 1,4-dienes and can be carried out in ordinary plant equipment because of the noncorrosive nature of the catalyst system, it is deficient in that it gives 1,4-diene products of low trans/cis ratio, generally about 2:1 to at most 3:1. Trans-1,4-dienes are much more desirable monomers for the EPDM elastomer synthesis because they give straight chain copolymers of good physical properties and sufficient unsaturation for sulfur vulcanization. The cis isomers give less unsaturated copolymers thus resulting in a reduced catalyst efficiency and rendering the copolymers less attractive commercially. There is therefore a need for a reliable process which can produce in a consistent manner 1,4-dienes of a high trans/cis isomer ratio.

SUMMARY OF THE INVENTION

It has now been discovered that 1,4-dienes of trans/cis isomer ratio of at least about 4:1 can be readily made by contacting ethylene with a 1,3-diene having a Formula I:

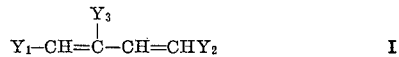

where $Y_1$ and $Y_2$ can each independently be hydrogen, a $C_1$–$C_{15}$ alkyl, a $C_7$–$C_{18}$ alkaryl, a $C_7$–$C_{18}$ aralkyl or a $C_6$–$C_{15}$ aryl radical, one of $Y_1$ and $Y_2$ always being hydrogen; and $Y_3$ can be hydrogen, methyl or ethyl radical, or a chlorine atom; in the presence of a catalyst system consisting essentially of the following components:

(a) an organic solvent-soluble nickel compound in which nickel is either zerovalent or divalent;
(b) a tertiary phosphine of Formula II

   II where A is the naphthyl radical; B is either a $C_1$–$C_6$ alkyl or the allyl radical; and D is either the phenyl or a substituted phenyl radical containing one or more of the following substituents:

(1) in the ortho-positions: F, Cl and $CH_3$, provided no more than one $CH_3$ radical is present;
(2) in the meta-positions: F, Cl, Br, $C_1$–$C_6$ alkyl, $C_1$–$C_6$ alkoxy, and $CF_3$;
(3) in the para-position: F, Cl, Br, $C_1$–$C_{18}$ alkyl, $CF_3$, $CCl_3$, $CBr_3$, —CN, and —NO;

$m$, $n$, and $p$ are positive integers whose sum $$m+n+p=3$$

each of $m$ and $n$ independently can be 0; $m$ cannot be larger than 1, while $p$ cannot be smaller than 1; provided that when D is one of the following radicals: pentafluorophenyl; pentachlorophenyl, or tetramethylphenyl, then $p$ must be 1; and
(c) an organoaluminum chloride or bromide.

It has also been found that the trans/cis ratio of 1,4-diene product can be still further increased by addition of a more basic organoaluminum compound of the general Formula III:

$$(R_1)_a AlZ_b \qquad (III)$$

where $R_1$ is an alkyl, cycloalkyl, or aryl radical having 1–12 carbon atoms; Z is one of the following groups:

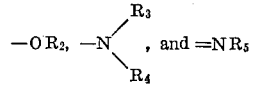

where each of $R_2$, $R_3$, $R_4$, and $R_5$ can be an alkyl, cycloalkyl, aralkyl, or aryl radical having 1–12 carbon atoms; when Z is $=NR_5$, $R_1$ can also be hydrogen; each of $a$ and $b$ is either 1 or 2, and the sum of $a+b$ is 3; except that when Z is $=NR_5$, each of $a$ and $b$ is 1, and $a+b$ is 2.

The reaction can be carried out either at atmospheric or at a superatmospheric pressure and the process can be either batchwise or continuous.

DEFINITION

The terms "trans" and "cis" 1,4-dienes refer to the isomerism about the C-4 bond. Where $Y_3$ in the starting 1,3-diene of Formula I, above, is hydrogen, a trans-isomer has the configuration about the C-4 bond

Where $Y_3$ is an atom or a group other than hydrogen, the trans-isomer has the configuration

The cis-isomer has the configuration

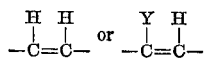

respectively.

DETAILED DESCRIPTION OF THE INVENTION

The addition of ethylene to a 1,3-diene is carried out in a dry inert atmosphere. Because of its low cost and ready availability, nitrogen is the preferred inert gas. In the batch process, the reactants and the catalyst components are dissolved in an inert solvent, such as an aromatic or aliphatic hydrocarbon or halogenated hydrocarbon. A solvent is not required in the continuous process. The nickel compound concentration generally is maintained within the range of about 0.00001–0.01 mole per liter. Below the lower limit the reaction does not proceed at a satisfactory rate, while above the upper limit the reaction is difficult to control, and an appreciable polymer formation is observed. Any soluble zerovalent or divalent nickel compound soluble in organic liquids can be used. Representative nickel compounds include nickel-(O)bis(1,5-cyclooctadiene) complex, nickel tetracarbonyl, nickel(O)(1,5,9-dodecatriene) complex, nickel(O)(cyclooctatetraene) complex, nickel(II) acetylacetonate, nickel(II) cyclohexylbutyrate, dicrotylnickel(II), diallylnickel(II), dimethallylnickel(II); and crotyl-, allyl-, and methallylnickel(II) dichloride, dibromide, and diiodide.

The amount of organoaluminum chloride or bromide should be at least equimolar with that of the nickel compound. Although a large molar excess of the organoaluminum halide can be present, e.g. 100:1, no advantage is gained thereby. The preferred molar ratio of aluminum to nickel, at which the reaction can be very well controlled, is about 5:1 to 10:1. Organoaluminum chlorides and bromides which can be used in the process of this invention include alkylaluminum, arylaluminum, and aralkylaluminum compounds. The organic radical usually has 1 to about 12 carbon atoms, the preferred number being 2–6 carbon atoms. These preferred compounds are readily available at moderate cost and have a high catalytic activity on weight basis. Representative compounds are diethylaluminum chloride, dibutylaluminum chloride, diisobutylaluminum chloride, dipropylaluminum chloride, diphenylaluminum chloride, dibenzylaluminum chloride, and the corresponding bromides; ethylaluminum dichloride, propylaluminum dichloride, isobutylaluminum dichloride, phenylaluminum dichloride, benzylaluminum dichloride, and the corresponding dibromides. Usually, alkylaluminum dihalides are the most readily available and especially preferred compounds.

In addition to the organoaluminum chloride or bromide or as replacement for part of the organaluminum chloride or bromide present in the reaction medium, an organoaluminum compound of the Formula III, also can be present in the solution. The presence of such an organoaluminum compound which has a higher basicity than an organoaluminum halide increases the trans/cis ratio of the 1,4-diene produced by the process of this invention. Representative organoaluminum compounds in which Z is $-OR_2$ include diethylaluminum ethoxide, dimethylaluminum ethoxide, diisobutylaluminum methoxide, diethylaluminum phenoxide, dipropylaluminum benzyloxide, diphenylaluminum ethoxide, dibenzylaluminum ethoxide, methylaluminum dipropoxide, benzylaluminum diethoxide, phenylaluminum dimethoxide, and isobutylaluminum diisopropoxide. Representative compounds in which Z is $-N(R_3)R_4$ include diethylaluminum - N,N-dimethylamide, dibutylaluminum-N,N-dimethylamide, dipropylaluminum-N,N-diethylamide, dibuylaluminum diisopropylamide, benzylaluminum-N,N,N',N'-tetramethyldiamide, phenylaluminum - N,N,N',N'-tetramethyldiamide, ethylaluminum - N,N,N',N' - tetraethyldiamide, and mehylaluminum-N,N,N',N'-tetramethyldiamide. Compounds in which Z is $=NR_5$ include for example ethylaluminum ethylimide, ethylaluminum methylimide, butylaluminum ethylimide, isopropylaluminum methylimide, benzylaluminum phenylimide, phenylaluminum methylimide, and isopropylaluminum benzylimide.

The amount of the more basic organoaluminum compound III is based on the concentration of the organoaluminum chloride of bromide in the solution. Usually, the concentration of compound III is chosen so that there are at least about two Z groups present in solution for three halogen atoms. It is not practical to increase the concentration of compound III beyond the ratio of about 1.2 Z groups for each halogen atom because the reaction rate is thereby unduly decreased. The preferred concentration range is about ¾–1 Z group for each halogen atom.

A tertiary phosphine able to form a stable complex with a nickel catalyst must always be present in the solution. The ability of a phosphine to form such a complex depends on several factors, including the phosphine's basicity and steric effects. It has been found that phosphines of the general Formula II above, satisfy all requirements. Representative phosphines include: methyl(1-naphthyl)phenylphosphine, diethylphenylphosphine, triphenylphosphine, pentafluorophenyldiphenylphosphine, 3, 5-di(trifluoromethyl)phenyl diphenylphosphine, 2-tolyldiphenylphosphine, (3 - butoxyphenyl)diphenylphosphine, ethyl di(3-bromophenyl)phosphine, (2-naphthyl) (2-cyanophenyl)phenylphosphine, tri(2-tolyl)phosphine, (4-hexadecylphenyl)diphenylphosphine, diallyl(2,3,5,6-tetramethylphenyl)-phosphine, and tri(2,6-difluorophenyl) phosphine.

Table I, below, compares the trans/cis ratios of 1,4-hexadiene made by addition of ethylene to butadiene in the presence of nickel(O)bis(1,5-cyclooctadiene) complex, isobutylaluminum dichloride and three different phosphines. No basic organoaluminum compound III is present:

TABLE I

| Phosphine: | Trans/cis ratio |
| --- | --- |
| Tributylphosphine (not within the scope of this invention) | 2:1 |
| Triphenylphosphine | 4:1 |
| Pentafluorophenyldiphenylphosphine | 6:1 |

The phosphine can usually be either premixed with the nickel compound or added separately. In some cases, for example when pentafluorophenyldiphenylphosphine is used, premixing is impractical because of the limited solubility of the phosphine-nickel adduct. In such cases it is best to add both compounds separately to the reaction medium. The organoaluminum halide usually is added last. The amount of phosphine present in the catalytic system should be about equimolar with that of the nickel compound. Although an excess phosphine can be present, it is undesirable because it can change the acidity of the medium to the extent that the addition reaction is impaired or prevented. A proper balance must therefore be maintained between the concentration of the phosphine and that of the acidic organoaluminum halide. Maximum amount of phosphine which can be tolerated by the reaction is less than about one mole per mole of organoaluminum halide.

The reaction is carried out within the temperature range of about −20° to +100° C. The most suitable temperature range is from 0 to 40° C. since the isomer ratio can best be controlled under these conditions and the reaction rate is satisfactory. At higher temperatures, more polymeric material can be formed. Generally, formation of polymeric material cannot be completely avoided. It is possible however to keep it at a low level of 3 to 4% or at most about 20% of total product. So long as total conversion is kept no higher than about 40–60%, formation of polymeric materials does not exceed these limits. Above this conversion range not only is a higher proportion of polymeric material formed, but also other by-products often increase. The reaction is exothermic, and the reactor preferably is cooled to control the temperature.

The reaction is carried out at superatmospheric pressure up to about 10,000 p.s.i.g. The most suitable range for the batch process is about 50 to 150 p.s.i.g. because good rates are obtained at reaction temperatures within this range. At higher pressures the reaction tends to proceed faster and may lead to more polymeric materials, while at atmospheric pressure the reaction rate is often too slow to be practical. In practice, a batch reactor is maintained under a constant ethylene pressure by leaving the ethylene supply lines open during the reaction. The amount of ethylene which is dissolved in the reaction medium depends on the partial pressure of ethylene gas above the solution. Ethylene which has undergone the addition reaction is constantly replaced. In the continuous process it is advantageous to use as high pressures and as short residence times as possible. Operation in the upper pressure range at about 10,000 p.s.i.g. is, therefore, preferred.

Prior to the reaction, the reactor is swept with dry nitrogen. In a batch reactor a small amount of nitrogen always is present, its partial pressure usually being no more than about 10 p.s.i. In a continuous reactor the nitrogen originally present is eventually completely displaced by the stream of ethylene.

1,3-dienes of Formula I which can be contacted with ethylene in this process include 1,3-butadiene, isoprene, 1,3-pentadiene, 1,3-hexadiene, chloroprene, 1,3-dodecadiene, 1,3-nonadecadiene, 4-phenyl-1,3-butadiene, 4-naphthyl-1,3-butadiene, 4-(4-tolyl)-1,3-butadiene, and 5-phenyl-1,3-pentadiene. Reaction of ethylene with 1,3-butadiene gives 1,4-hexadiene, which is a very useful comonomer in the preparation of EPDM elastomers. The concentration of 1,3-diene in a batchwise reaction can be varied virtually without limits, but it is convenient to use diene solutions which are about 1–2 molar. In a continuous process, the diene itself can serve as a solvent.

When the reaction has reached the desired conversion level, organoaluminum compounds present in the solution are decomposed by adding a compound having an active hydrogen, such as an alcohol, phenol, or even water. The preferred compound is a higher alcohol such as for example decanol. The reaction mixture is distilled to separate the reaction products from the monomers and from the catalyst. Alternately, the reaction can be stopped by cooling to about −20° C., and the monomers can be removed at this low temperature and a reduced pressure. In either case, the monomers can be recycled. When the reaction is stopped by cooling, the catalyst also can be recycled. It is usually necessary in such a case to add more organoaluminum compounds, while it is not necessary to replace the nickel compound, since it is not undergoing decay in the reaction. The addition of ethylene to 1,3-dienes can be run in either continuous or batch systems.

1,4-dienes with high trans-isomer content, which are prepared by the process of the present invention, are particularly useful in the preparation of ethylene/propylene terpolymers (EPDM polymers), in which they supply vulcanization sites.

This invention is now illustrated by the following examples in which all the parts, proportions and percentages are by weight unless otherwise indicated.

PREPARATION OF NICKEL(O)BIS(CYCLOOCTADIENE) COMPLEX (NOT WITHIN THE SCOPE OF THE INVENTION)

The following compounds are added to a round-bottom glass flask under a protective nitrogen atmosphere: 56 grams of nickel bis(acetylacetonate), 118 grams of 1,5-cyclooctadiene, 160 milliliters of benzene, and 5 grams of 1,3-butadiene. The resulting mixture is cooled to −2 to −5° C.

Then, in the course of 4–5 hours aluminum triethyl (in excess of the stoichiometric amount of 26 grams), dissolved in 60 milliliters of benzene, is added to the cold mixture until the original greenish color changes to red. The resulting composition is then allowed to warm to room temperature under the protective nitrogen atmosphere over a period of about 16 hours. The precipitated yellow crystals of nickel(O)bis(cyclooctadiene are filtered off under nitrogen, washed with benzene and with diethyl ether, and dried under vacuum. Nickel(O)bis (cyclooctadiene) is stored in the cold in the absence of light and oxygen.

Examples 1–9.—General procedure for preparing 1,4-hexadiene

A two-liter stainnless-steel autoclave is charged with one liter of toluene under a protective atmosphere and cooled to a temperature below −20° C. 1,3-butadiene is distilled into the autoclave; the aotoclave is closed and the temperature raised to 25° C. Gaseous ethylene is introduced to maintain the desired operating pressure. First, the catalyst is made by introducing, in turn, the aluminum compound (or compounds) and a solution containing nickel(O)bis(cyclooctadiene) complex and a phosphine. The molar ratio of nickel to phosphine is usually 1:1 but may be decreased to about 1:4. The nickel(O)bis(cyclooctadiene) complex and the phosphine can be added separately, or they can be premixed ahead of time at room temperature.

The temperature is kept at 25–35° C. during the hexadiene preparation. The progress of the reaction is followed by removing samples from time to time. The reaction is finally stopped by introducing an alcohol such as isopropyl alcohol or butyl alcohol. After gases have been vented, the remaining liquid phase is fractionally distilled to separate the $C_6$ fraction and toluene from high-boiling residue. The $C_6$ fraction (material boiling up to 90° C. at atmospheric pressure) includes 1,4-hexadiene, its isomerization product 2,4-hexadiene, and 3-methyl-1,3-pentadiene.

The experimental details and results of Experiments 1–9 are presented below:

Example 1

Starting materials.—Ethylaluminum dichloride (9 mmoles), diethylaluminum ethoxide (13.8 mmoles), pentafluorophenyldiphenylphosphine (3 mmoles), 1,3-butadiene (171 grams) and ethylene (to total pressure of 105 p.s.i.g.). The Al/Ni mole ratio is 7.6:1. The yield of the $C_6$ fraction is 85 grams after 180 minutes, and the 1,4-hexadiene content is 80%. The trans/cis ratio is 16:1, equivalent to the trans-isomer content of 94%.

Example 2

Starting materials.—Isobutylaluminum dichloride (6 mmoles), diethylaluminum diethylamide (12 mmoles), pentafluorophenyldiphenylphosphine (3 mmoles), 1,3-butadiene (186 grams), and ethylene (to total pressure of 145 p.s.i.g.). The Al/Ni mole ratio is 6:1. The yield of the $C_6$ fraction is 142 grams after 125 minutes, and the 1,4-hexadiene content is 80%. The trans/cis ratio is 9:1, equivalent to the trans-isomer content of 90–91%.

Example 3

Starting materials.—Diisobutylaluminum chloride (12 mmoles), ethylaluminum diethoxide (6 mmoles), pentafluorophenyldiphenylphosphine (3 mmoles), 1,3-butadiene (142 grams), and ethylene (to total pressure of 80 p.s.i.g.). The Al/Ni mole ratio is 6:1. The yield of the $C_6$ fraction is 50 grams after 120 minutes, and the 1,4-hexadiene content is 88%. The trans/cis ratio is 9.5:1 corresponding to the trans-isomer content of 91%.

Example 4

Starting materials.—Ethylaluminum dichloride (6 mmoles), diethylaluminum ethoxide (9 mmoles), triphenylphosphine (3 mmoles), 1,3-butadiene (184 grams), and ethylene (to total pressure of 125 p.s.i.g.). The Al/Ni mole ratio is 5:1. The yield of the $C_6$ fraction is 157 grams after 40 minutes, and the 1,4-hexadiene content is 72%. The trans/cis ratio is 6:1, corresponding to the trans-isomer content of 86%.

Example 5

Starting materials.—Isobutylaluminum dichloride (5 mmoles), diethylaluminum-diethylamide (10.8 mmoles), triphenylphosphine (2.2 mmoles), 1,3-butadiene (174 grams), and ethylene (to total pressure of 145 p.s.i.g.). The Al/Ni mole ratio is 9.3:1. The yield of the $C_6$ fraction is 165 grams after 80 minutes, and the 1,4-hexadiene content is 81%. The trans/cis ratio is 6.4:1, corresponding to the trans-isomer content of 86%.

Example 6

Starting materials.—Ethylaluminum dichloride (6 mmoles), diethylaluminum ethoxide (10 mmoles), pentachlorophenyldiphenylphosphine (3 mmoles), 1,3-butadiene (173 grams), and ethylene ( to total pressure of 120 p.s.i.g.). The Al/Ni mole ratio is 6.4:1. The yield of the $C_6$ fraction is 90 grams after 390 minutes, and the 1,4-hexadiene content is 95%. The trans/cis ratio is 6:1 after 90 minutes and decreases gradually to 4.2:1 at the end of 390 minutes, corresponding to the trans-isomer content range of 86–81%.

Example 7

Starting materials.—Isobutylaluminum dichloride (5 mmoles), pentafluorophenyldiphenylphosphine (1 mmole), 1,3-butadiene (155 grams), and ethylene (to total pressure of 70 p.s.i.g.). The Al/Ni mole ratio is 5:1. The yield of the $C_6$ fraction is 65 grams after 60 minutes, and the 1,4-hexadiene content is 89%. The trans/cis ratio is 6:1, corresponding to the trans-isomer content of 86%.

Example 8

Starting materials.—Isobutylaluminum dichloride (6 mmoles), ethylimidoaluminum hydride (10 mmoles), triphenylphosphine (2 mmoles), 1,3-butadiene (176 grams) and ethylene (to total pressure of 90 p.s.i.g.). The Al/Ni mole ratio is 8:1. The yield of the $C_6$ fraction is 64 grams after 90 minutes, and the 1,4-hexadiene content is 90%. The trans/cis ratio is 6:1, corresponding to the trans-isomer content of 86%.

Example 9

Starting materials.—Isobutylaluminum dichloride (5 mmoles), tris[2 - (α,α,α - trifluorotolyl)]phosphine (1 mmole), 1,3-butadiene (137 grams), and ethylene (to total pressure of 70–80 p.s.i.g.). The Al/Ni mole ratio is 5:1. The yield of the $C_6$ fraction is 49 grams after 60 minutes, and the 1,4-hexadiene content is 90%. The trans/cis ratio is 5:1, corresponding to the trans-isomer content of 83%.

We claim:

1. In a process of making a 1,4-diene by contacting ethylene with a 1,3-diene of the general formula

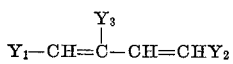

where $Y_1$ and $Y_2$ can each independently be hydrogen or a radical from the group $C_1$–$C_{15}$ alkyl, $C_6$–$C_{15}$ aryl, $C_7$–$C_{18}$ aralkyl and $C_7$–$C_{18}$ alkaryl; and $Y_3$ can be hydrogen or a substituent from the group methyl and ethyl radical and chlorine atom; in the presence of a zerovalent or divalent nickel compound, an organoaluminum chloride or bromide, and a phosphine; the improvement consisting essentially of producing a 1,4-diene product having a trans/cis ratio of at least 4:1 by weight by using a phosphine having the formula

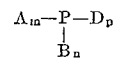

in which A is the naphthyl radical; B is a radical from the group $C_1$–$C_6$ alkyl and the allyl radical; and D is a radical from the group phenyl and a substituted phenyl containing the following substituents:

(1) in the ortho-positions: a substituent selected from fluorine atom, chlorine atom and methyl radical; provided no more than one methyl radical is present;

(2) in the meta-positions: a substituent selected from fluorine atom, chlorine atom, bromine atom, a $C_1$–$C_6$ alkyl radical, a $C_1$–$C_6$ alkoxy radical and the trifluoromethyl radical;

(3) in the para-position: a substituent selected from fluorine, chlorine, and bromine atom; a $C_1$–$C_{18}$ alkyl, the $CF_3$, —$CCl_3$, —$CBr_3$, —CN, and NO radical;

$m$, $n$ and $p$ are positive integers whose sum $m+n+p=3$; each of $m$ and $n$ independently can be 0; $m$ cannot be larger than 1; and $p$ cannot be smaller than 1; provided that when D is selected from pentafluorophenyl, pentachlorophenyl, and tetramethylphenyl radicals, $p$ must be 1, and the further improvement of also having present a compound of the formula $(R_1)_aAlZ_b$, where Z is selected from the group —$OR_2$, —$N(R_3)R_4$, and =$NR_5$; and $R_1$, $R_2$, $R_3$, $R_4$, and $R_5$ are members of the group alkyl, cycloalkyl, aryl, and alkaryl radicals having 1–12 carbon atoms and each of $a$ and $b$ is either 1 or 2, and the sum of $a+b$ is 3 except that when X is =$NR_5$, each of $a$ and $b$ is 1, and $a+b$ is 2; provided that when Z is =$NR_5$, $R_1$ can also be hydrogen; and further that about 0.67–1.2 Z groups are initially present in solution for each halogen atom of the organoaluminum chloride or bromide.

2. A process of claim 1, in which the nickel compound is nickel(O)bis(cyclooctadiene) complex.

3. A process of claim 2, in which the phosphine is pentafluorophenyldiphenylphosphine; the compound

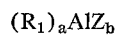

is diethylaluminum ethoxide, and the organoaluminum halide is ethylaluminum dichloride.

4. A process of claim 2 in which the phosphine is triphenylphosphine; the compound $(R_1)_aAlZ_b$ is diethylaluminum ethoxide, and the organoaluminum halide is ethylaluminum dichloride.

5. A process of claim 2 in which the phosphine is triphenylphosphine; the compound $(R_1)_aAlZ_b$ is diethylaluminum N,N-dimethylamide, and the organoaluminum halide is isobutylaluminum dichloride.

6. In a process of making a 1,4-diene by contacting ethylene with a 1,3-diene of the general formula

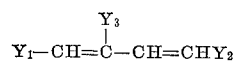

where $Y_1$ and $Y_2$ can each independently be hydrogen or a radical from the group $C_1$–$C_{15}$ alkyl, $C_6$–$C_{15}$ aryl, $C_7$–$C_{18}$ aralkyl and $C_7$–$C_{18}$ alkaryl; and $Y_3$ can be hydrogen or a substituent from the group methyl and ethyl radical and chlorine atom; in the presence of a zerovalent or divalent nickel compound, an organoaluminum chloride or bromide, and a phosphine; the improvement consisting essentially of producing a 1,4-diene product having a trans/cis ratio of at least 4:1 by weight by using a phosphine selected from the group consisting of pentafluorophenyldiphenylphosphine and tris[2 - ($\alpha,\alpha,\alpha$ - trifluorotolyl)]-phosphine.

7. A process of claim 6 in which the phosphine is pentafluorophenyldiphenylphosphine.

8. A process of claim 6 in which the phosphine is tris[2-($\alpha,\alpha,\alpha$-trifluorotolyl)]phosphine.

References Cited
UNITED STATES PATENTS 3,306,948   2/1967   Kealy _____ 260—680

PAUL M. COUGHLAN, JR., Primary Examiner

U.S. Cl. X.R.

252—431

PO-1050
(5/69)

UNITED STATES PATENT OFFICE
CERTIFICATE OF CORRECTION

Patent No. 3565967          Dated February 23, 1971

Inventor(s) JOHN WILFRED COLLETTE and AARON CHUNG LIONG SU

It is certified that error appears in the above-identified patent and that said Letters Patent are hereby corrected as shown below:

In column 8, line 39, "X" should be Z

Signed and sealed this 1st day of June 1971.

(SEAL)
Attest:

EDWARD M. FLETCHER, JR.        WILLIAM E. SCHUYLER, JR
Attesting Officer               Commissioner of Patents